(12) United States Patent
Brinkley, III

(10) Patent No.: US 7,524,342 B2
(45) Date of Patent: Apr. 28, 2009

(54) METHOD AND APPARATUS FOR GENERATING HYDROGEN GAS ON DEMAND FROM WATER WITH RECOVERY OF WATER AND COMPLETE RECYCLING OF CONSUMABLE MATERIAL

(75) Inventor: William J. Brinkley, III, P.O. Box 293, Iuka, MS (US) 38852

(73) Assignee: William J. Brinkley, III, Iuka, MS (US)

( * ) Notice: Subject to any disclaimer, the term of this patent is extended or adjusted under 35 U.S.C. 154(b) by 543 days.

(21) Appl. No.: 10/691,049

(22) Filed: Oct. 23, 2003

(65) Prior Publication Data
US 2004/0081615 A1 Apr. 29, 2004

Related U.S. Application Data

(60) Provisional application No. 60/422,159, filed on Oct. 29, 2002.

(51) Int. Cl.
*C01B 3/08* (2006.01)
*B01J 7/00* (2006.01)
(52) U.S. Cl. .................. 48/61; 422/187; 48/127.9; 48/197 R; 423/657; 423/192; 423/948; 423/658
(58) Field of Classification Search .............. 48/61, 48/62 R, 118.5, 197 R; 423/657–658
See application file for complete search history.

(56) References Cited

U.S. PATENT DOCUMENTS

| | | | | |
|---|---|---|---|---|
| 3,574,560 A | * | 4/1971 | Von Sturm et al. | 422/111 |
| 3,669,751 A | * | 6/1972 | Richman | 429/17 |
| 3,895,102 A | * | 7/1975 | Gallagher | 423/657 |
| 4,818,637 A | * | 4/1989 | Molter et al. | 429/15 |
| 2001/0013321 A1 | * | 8/2001 | Knowlton et al. | 123/3 |

* cited by examiner

*Primary Examiner*—Alexa D. Neckel
*Assistant Examiner*—Kaity Handal
(74) *Attorney, Agent, or Firm*—Townsend and Townsend and Crew LLP.; M. Henry Heines

(57) ABSTRACT

A hydrogen gas generation system for vehicles and stationary power applications comprises a trio of rigid, cylindrical high pressure reservoir tanks interconnected with suitable fittings and pipelines. A water holding tank alternatively stores hydroxide solution, or transfers it to an adjacent gas generating tank, containing a plurality of tubular, aluminum fuel rods. When the holding tank is suitably pressurized, hydroxide solution is transferred into the generating tank to start a reaction with a plurality of elongated, tubular aluminum rods disposed therewithin. Conversely, the liquid contents of the generating tank can be forcibly pressured back into the holding tank to stop the gas generation reaction. High pressure hydrogen gas is humidified in the third tank prior to combustion as fuel. Humidified hydrogen is transferred via control valves to the application.

17 Claims, 5 Drawing Sheets

METHOD AND APPARATUS FOR GENERATING HYDROGEN GAS ON DEMAND FROM WATER WITH RECOVERY OF WATER AND COMPLETE RECYCLING OF CONSUMABLE MATERIAL

CROSS REFERENCE TO RELATED APPLICATION

This utility patent application is based upon, and claims the priority filing date, of my previously-filed, copending U.S. Provisional patent application entitled "METHOD OF GENERATING HYDROGEN GAS ON DEMAND FROM WATER WITH RECOVERY OF WATER AND COMPLETE RECYCLING OF CONSUMABLE MATERIAL," filed Oct. 29, 2002, Ser. No.: 60/422,159.

BACKGROUND OF THE INVENTION

1. Field of the Invention

The present invention relates generally to the generation of hydrogen gas and the employment of it as a combustible fuel. More particularly, the present invention relates to an "on-demand" chemical system for producing hydrogen gas and using it for propulsion, wherein critical elements are recovered and recycled.

2. Description of the Related Art

It has long been recognized by those skilled in the art that hydrogen, the most abundant element in the universe, is relatively cheap and plentiful. Long recognized as a basic constituent of water, many have dreamt of its use as a fuel. Accordingly, the prior art reflects numerous diverse attempts at recovering or generating hydrogen, and a virtual plethora of patents directed to propulsion systems and energy storage or transfer systems involving it.

U.S. Pat. No. 3,943,719. discloses a power system comprising a reactor in which a hydride absorbs hydrogen at low pressure and low temperature, and then heating the hydride at constant volume so as to release large quantities of hydrogen at high temperatures and pressure. This released hydrogen is used to produce power and yield refrigeration. Electrical power can be generated by expanding the released hydrogen through a turbine or other power producing devices.

U.S. Pat. No. 4,005,185 issued Jan. 25, 1977 discloses a method for generating hydrogen using metallic zinc within an aqueous solution, preferably ammonium carbonate.

U.S. Pat. No. 4,055,962 discloses a hydrogen-hydride absorption system comprising a sequential method of reversibly combining hydrogen with a hydride-forming material, heating the hydride at constant volume, and means for conveying hydrogen between the reactors. In the power or heat pump cycle, the hydride in a first reactor is heated to desorb hydrogen gas. The gas flows to a second hydride bed in a second reactor where it is absorbed at a temperature lower then the temperature of desorption of the first hydride bed. Absorption of the hydrogen by the second reactor releases the heat of absorption. This heat of absorption is typically removed by a heat exchanger. In the heat pump mode of operation, the above cycle is sequentially repeated through a series of reactors so that the heat of absorption is sequentially added to the heat exchange fluid.

U.S. Pat. No. 4,085,709 issued Apr. 25, 1978 discloses a fuel system for vehicles that generates hydrogen gas electrically and stores it on board the vehicle for combustion. The system includes a gas cylinder, an electrolyzer connected to the gas cylinder, and a power supply connected to the electrolyzer, and a gas storage cylinder.

U.S. Pat. No. 4,090,361 discloses improved-power cycles for using the hydride-dehydride-hydrogen (HDH) power cycle to produce hydrogen gas continuously at high pressure and elevated temperatures. This gas can be used to produce power and refrigeration. The hydrogen gas can be passed directly to an expansion device, such as a turbine, or the hydrogen gas can be the working fluid used to transfer heat to a secondary system. Terry discloses using the HDH cycle to continuously produce hydrogen gas to drive an expansion device such as a turbine.

U.S. Pat. No. 5,228,529 issued Jul. 20, 1993 employs magnesium anodes in renewable fuel cells that produce hydrogen gas on demand for powering a vehicle. In operation the magnesium anode is converted into magnesium hydroxide precipitate, which is removed and collected for recycling. The magnesium anode and electrolyte is replaced to recharge the fuel cell.

U.S. Pat. No. 5,286,473 issued Feb. 15, 1994 discloses a system reacting an alkali metal with an ionizable hydrogen compound selected from the group consisting of hydrochloric acid, water or mixtures thereof to produce hydrogen and an alkali metal chloride or alkali metal hydroxide, depending upon whether hydrochloric acid or water is used to react with the alkali metal. The alkali metal chloride is recycled. The hydrochloric acid is recycled to produce hydrogen by reaction with the alkali metal. The aluminum hydroxide formed can be electrolyzed to aluminum metal and water to provide a method of recovering aluminum metal from aluminum scrap which previously has not be readily recyclable.

U.S. Pat. No. 5,293,857 issued Mar. 15, 1994 shows a combination wherein hydrogen gas fuel is combusted within an internal combustion engine. The proportion of hydrogen to oxygen is approximately 2:1, and the density of hydrogen is regulated so that the burn rate of the combined gas mixture approximates that of a fossil fuel.

U.S. Pat. No. 5,634,341 issued Jun. 3, 1997 and U.S. Pat. No. 5,867,978 issued Feb. 9, 1999 disclose related systems for generating hydrogen gas from a charge of fuel comprising lithium, aluminum or alloys thereof. The fuel is heated until molten, and sprayed with water within a pressure vessel. The process may be employed with either a Rankine-cycle engine or a hydrogen-oxygen fuel cell system.

U.S. Pat. No. 5,728,464 issued Mar. 17, 1998 discloses an on-demand hydrogen generation system for propulsion. Sodium pellets are exposed to water to generate hydrogen.

U.S. Pat. No. 5,830,426 issued Nov. 3, 1998 illustrates an aqueous hydrogen generation process wherein an electrical vehicle utilizes a hydrogen-air fuel cell to power electrical drive motors. Hydrogen fuel is supplied on demand by a reactor bed of iron particles that reacts with water in the presence of an alkali hydroxide catalyst. Potassium hydroxide in a range of concentrations between 50 to 60 percent by weight is preferred. Hydrogen gas generated in situ is stored within a compartment containing iron materials. Iron oxide produced during hydrogen generation may be recovered and recycled.

U.S. Pat. No. 5,865,262 issued Feb. 2, 1999 discloses a self-propelled hydrogen fuel system. A hydrogen gas tank receives gas from a chemical reactor equipped with a catalyst. Alcohol is vaporized in an heat exchanger, reacting with the catalyst in the chemical reactor and forming hydrogen gas and acetic ether, which are stored in appropriate tanks.

U.S. Pat. No. 5,867,978 issued Feb. 9, 1999 discloses a system for generating hydrogen for generating hydrogen gas from a charge of fuel selected from the group consisting of lithium and alloys of lithium and aluminum. The charge of fuel is placed into an enclosed vessel, then heated until it is molten. A reactant consisting of water is introduced into the vessel, as by spraying from a nozzle, for reaction with the charge of fuel resulting in the production of hydrogen gas and heat which are withdrawn from the vessel. Prior to initiation of the process, an inert gas atmosphere, such as argon, may be imparted to the interior of the vessel. A sufficiently large mass flow of the reactant through the nozzle is maintained to assure that there be no diminution of flow resulting from the formation on the nozzle of fuel and chemical compounds of the fuel. Optimum charges of the fuel are application specific and the ranges of the constituents are dependent upon the particular use of the system. The process and apparatus of the invention may be incorporated into a Rankine cycle engine or into a hydrogen oxygen fuel cell system.

BRIEF SUMMARY OF THE INVENTION

This invention provides a unique, on-demand hydrogen production and generation system. Importantly, the hydrogen gas collected within the reaction generator tank is first humidified prior to combustion.

My preferred hydrogen generation system comprises a plurality of interconnected holding tanks, and a plurality of interconnected valves and control pipelines. A first, rigid upright, cylindrical holding tank acts as a reservoir and as a return destination, holding, in the best mode, approximately twelve gallons of hydroxide solution. The holding tank is connected to a gas generating tank, which contains a plurality of tubular, aluminum fuel rods. The holding tank can be pressurized to transfer hydroxide solution into the generating tank to start the reaction; conversely, the liquid contents of the generating tank, even while actively reacting, can be emptied and forced into the holding tank to stop the reaction, as when a vehicle powered by the system stops or rests.

Low pressure hydrogen gas is humidified prior to combustion as fuel. The gas output of the generating tank feeds an adjacent humidifier tank. Humidity of the hydrogen is adjusted to approximately 100% in this manner to promote clean and efficient burning.

Humidified hydrogen is transferred via control valves to the application. Preferably, it is delivered to suitable fuel injectors that feed an internal combustion motor. The normally hot, low pressure gas exhaust is preferably vented through the engine exhaust manifold into a condenser for cooling and recycling. Spent aluminum detritus may also be recovered for recycling.

Thus a basic object is to generate a safe, powerful, and non-polluting energy source for vehicles.

Another basic object is to reduce the contemporary reliance upon fossil fuels.

Another object of my invention is to safely and quickly produce hydrogen gas in an "on demand" manner suitable for use with vehicles.

Still another object of my invention is to provide an affordable and cost-efficient replacement fuel source for vehicles.

Another object is to safely and dependably turn on and/or turn off the chemical production of hydrogen gas, thereby providing a hydrogen propulsion system suitable for practical use.

Yet another important object of my invention is to provide an environmentally friendly, non-polluting energy source for vehicles.

Thus, another object is to provide an energy source that can be easily and economically renewed and/or stored.

Still another object is to recycle and reuse various constituent materials and chemicals utilized in the preferred reaction process.

A further object is to provide a low-cost energy source for vehicles.

Yet another object is to convert a fluid and solid into raw hydrogen suitable for use within modem internal combustion engines.

A related object is to regulate and control the humidity if the propelling hydrogen generated through the process.

Another important object is to recycle the aluminum control rods preferably employed in the reaction.

Conversely, an important object is to optimize the rate at which the moisture-controlled hydrogen gas generated though my system may be liberated for use at a rate of consumption commensurate with the energy use of a traveling vehicle.

Another basic object is to provide hydrogen gas to propel vehicles or power various power plants.

Another important object is to de-salinate water. It is a feature of this invention that sea water (i.e., salt water) may be substituted for the tap water or distilled water normally used, and it can be received from the condenser as drinking water, on a one-gallon-in, one-gallon-out basis.

These and other objects and advantages of the present invention, along with features of novelty appurtenant thereto, will appear or become apparent in the course of the following descriptive sections.

BRIEF DESCRIPTION OF THE SEVERAL VIEWS OF THE DRAWINGS

In the following drawings, which form a part of the specification and which are to be construed in conjunction therewith, and in which like reference numerals have been employed throughout wherever possible to indicate like parts in the various views.

DETAILED DESCRIPTION OF THE INVENTION

Figure 1:
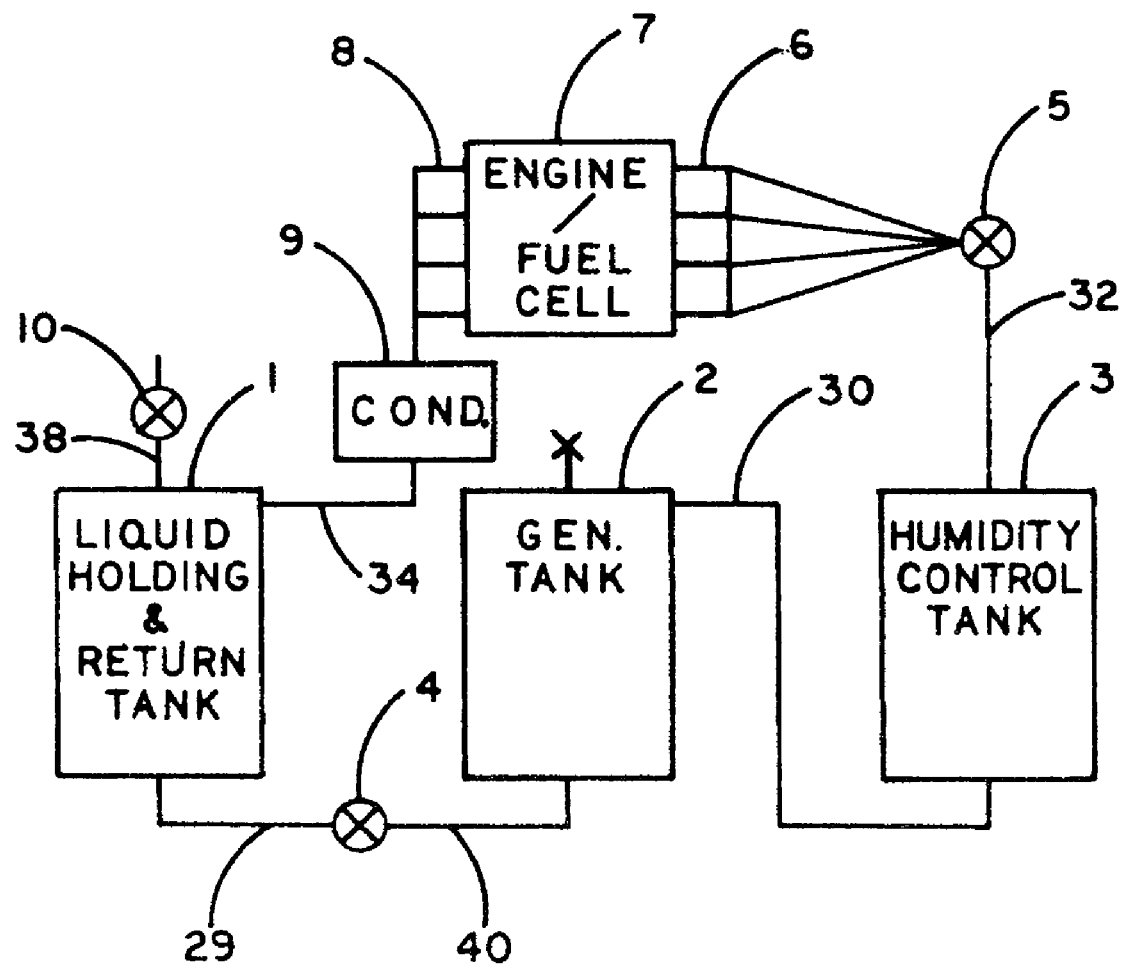
FIG. 1 is an overall block diagram of my preferred hydrogen gas generation system.

Turning now to the drawings, FIG. 1 shows the overall block diagram of the preferred system. A large, upright, cylindrical liquid holding tank 1 acts as a reservoir and as a return destination. Liquid preferably comprising water and potassium hydroxide solution can enter tank 1 via valve 10, and it can exit via line 29 and shut-off valve 4. When valve 4 is opened, fluid, preferably a hydroxide solution, flows into generating tank 2 via a conduit 40, as explained hereinafter. Resulting hydrogen gas is outputted via line 30 into a humidity control tank 3. Humidity is controlled in this tank, and hydrogen gas collected and outputted via line 32 reaches pressure valve 5. Tanks 1-3 comprise welded, high pressure vessels that are cylindrical, rigid, and upright.

The reference numeral 6 (FIG. 1) schematically designates a plurality of fuel injectors (i.e., hydrogen gas injectors) employed upon an internal combustion engine. Suitable injectors are illustrated in use with a hydrogen-powered motor in my prior U.S. Pat. No. 5,085,176, which, for disclosure purposes, is hereby incorporated by reference. The engine or alternatively, a suitable fuel cell into which hydrogen is to be injected, has been generally designated by the reference numeral 7. Engine exhaust, primarily low pressure, high temperature steam, is outputted through the exhaust manifold 8 into a cooler or condenser 9, that in turn outputs water into tank 1 via line 34. Once the system is turned on, and the engine 7 is started, hydrogen fuel will be produced on demand, at a rate commensurate with the speed and consumption of the engine. The main generation takes place in tank 2, but tank 1 has a control effect on the apparatus.

Figure 2:
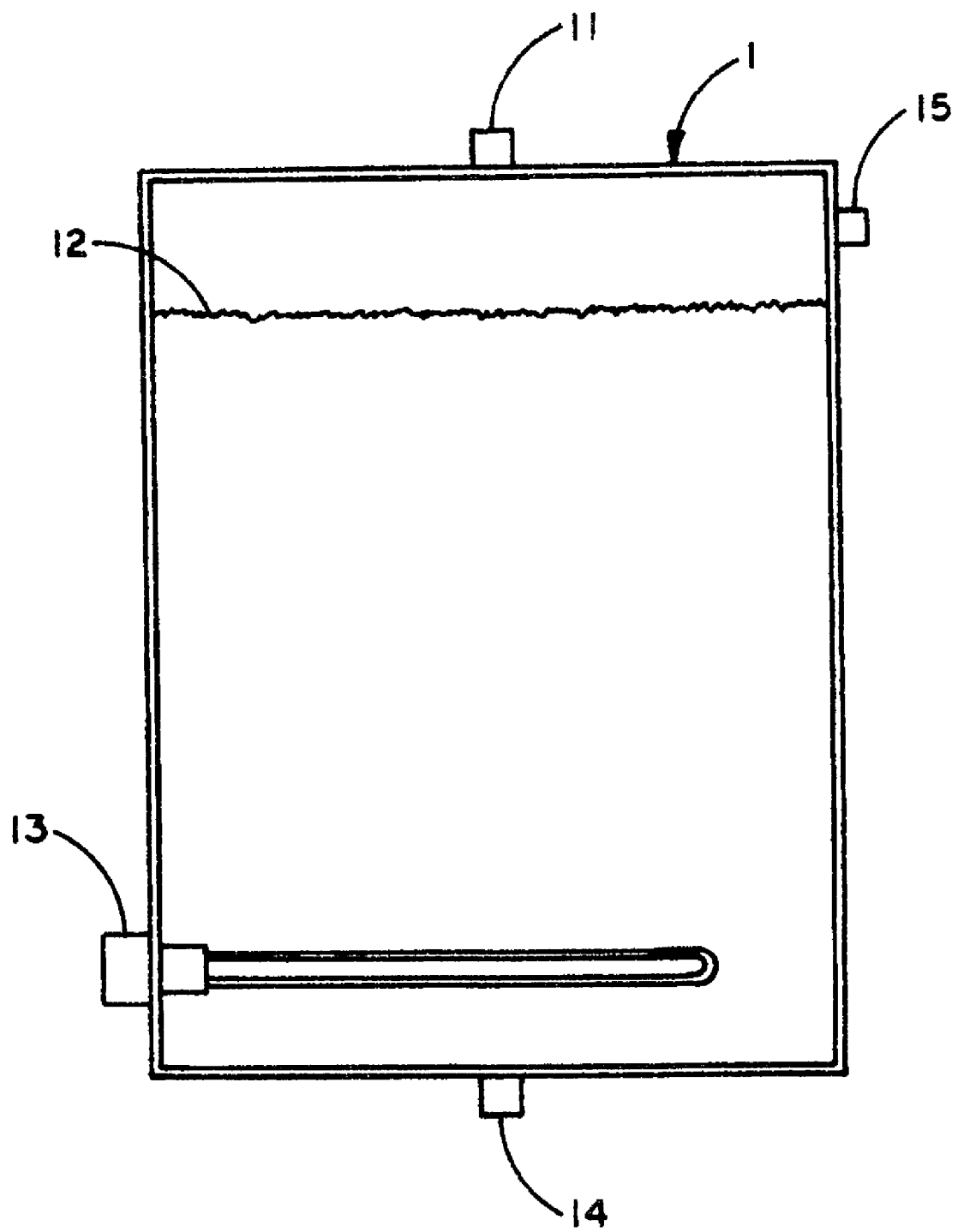
FIG. 2 is an enlarged, vertical sectional view of the liquid holding tank of FIG. 1.

In FIG. 2, tank 1 is seen filled to approximate capacity with liquid 12, comprising a mixture of water and potassium hydroxide. Preferably, there is 25% potassium hydroxide by weight. Inlet fittings 11 and 15 and exhaust fitting 14 are welded to the rigid tank body. Water inlet 15 is coupled to line 34 (FIG. 1). Inlet 11 is coupled to line 38. Importantly, a 110 volt A.C. water heater element 13 is placed near the bottom of tank 1 to raise the water temperature to approximately 180 degrees Fahrenheit. Alternatively, a twelve-volt D.C. element may be used.

Figure 3:
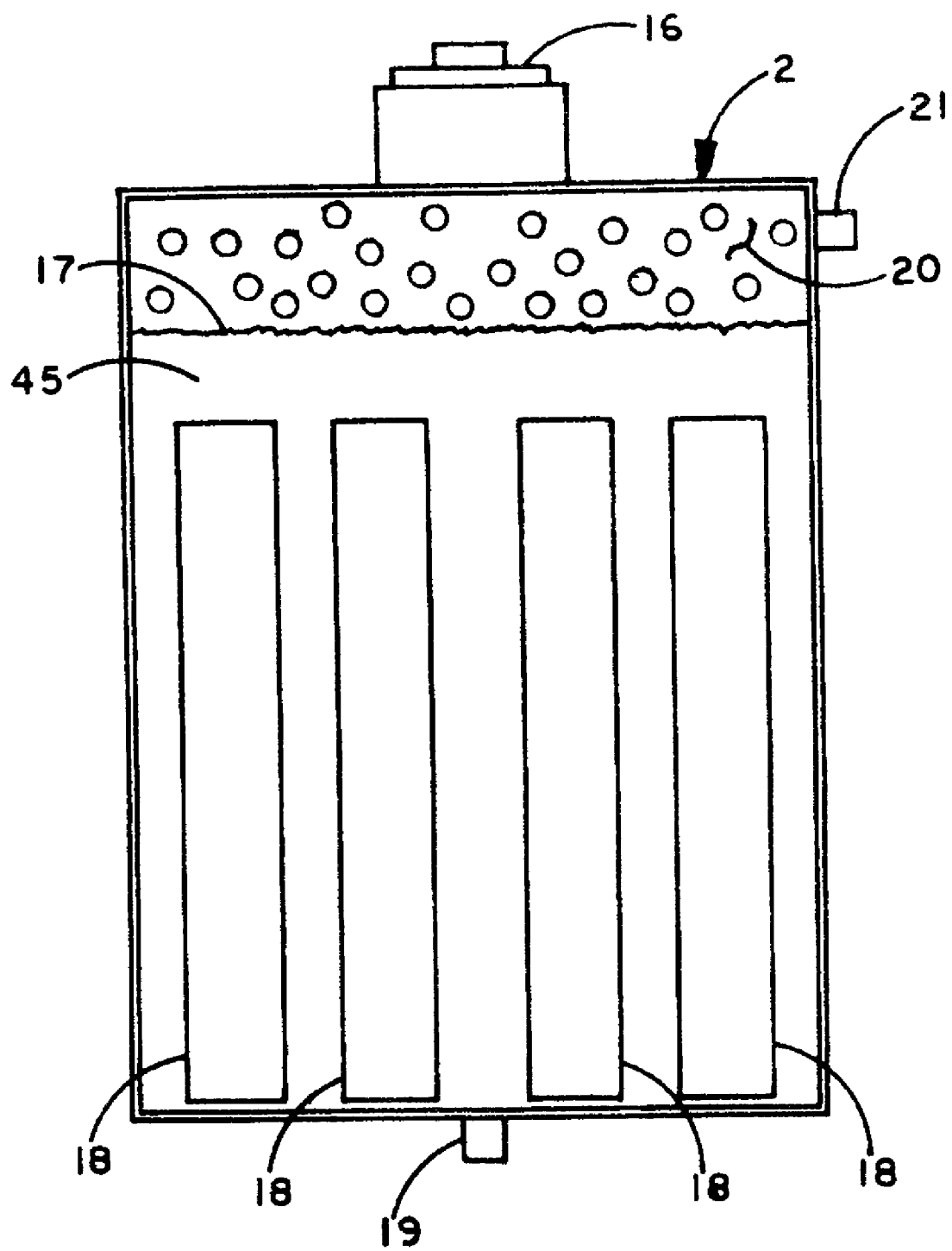
FIG. 3 is an enlarged, vertical sectional view of the generating tank of FIG. 1.
Figure 4:
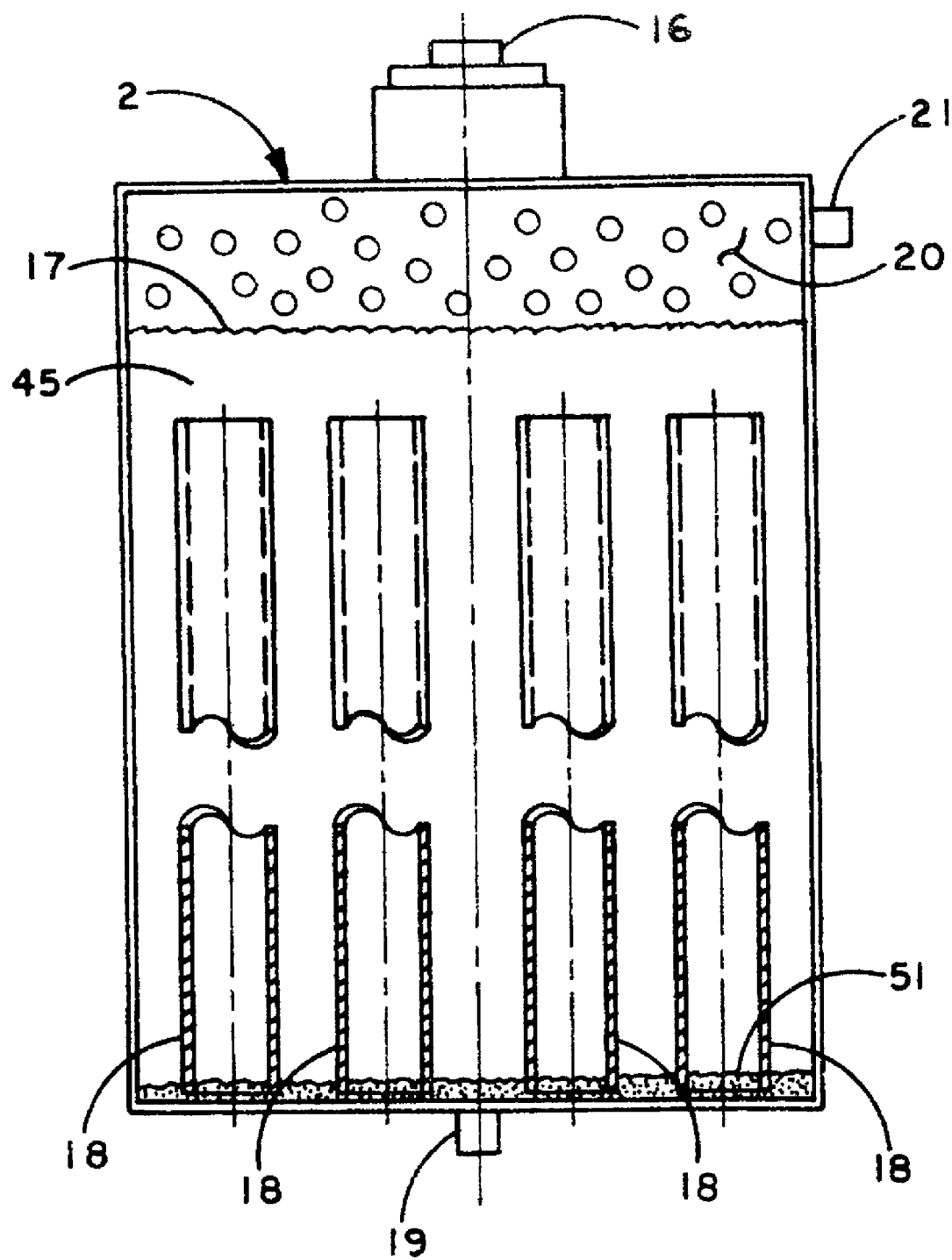
FIG. 4 is a fragmentary, sectional view of the gas generating tank, with portions broken away for clarity or omitted for brevity; and, FIG. 5 is an enlarged, vertical sectional view of the humidity control tank.

With joint reference now directed to FIGS. 3 and 4, tank 2 comprises a rigid, upright, generally cylindrical enclosure like the other tanks in the system. Tank 2 can be selectively filled with liquid from tank 1 via line 40 (FIG. 1) and fitting 19 (FIG. 3). External pressure is applied to gas outlet 21, as explained later. The reference numeral 17 broadly designates the hydroxide solution forced into tank 2 for hydrogen generation. A large inspection fitting 16 at the top of tank 2 (FIGS. 3, 4) can be removed to permit user access into the tank interior 45. The reference numeral 20 (FIGS. 3, 4) broadly designates hydrogen gas bubbles that are yielded upon the reaction between the solution 17, and the plurality of aluminum tubes 18 disposed in an orderly and regular array within the tank 2. When fitting 16 is removed, and after draining out fluid 17, these elongated, cylindrical aluminum tubes 18 may be placed within the tank. Afterwards, returning fitting 16 atop the tank 2 allows the interior to be sealed and pressured.

As best seen in FIG. 4, each of the fuel tubes 18 is preferably tubular, and preferably they comprise aluminum. In the best mode the tubes are 2.5 inches outer diameter, with a 2.0 inch inner diameter. Since the tubes 18 have a hollow interior, a maximal exposure of metal to hydroxide solution results, so the reaction speed is increased. In fact, the reaction is highly exothermic, and generates hydrogen under considerable pressure (i.e., 20-300 PSI). As the reaction continues, the aluminum tubes reduce to powder. The aluminum hydroxide waste collects as dust or fine grained powder 51 (FIG. 4) at the bottom of the tank 2, and it can be removed during regular maintenance and periodic tank cleaning, as fuel tubes 18 (FIGS. 3, 4) are periodically replaced to recharge the system.

Figure 5:
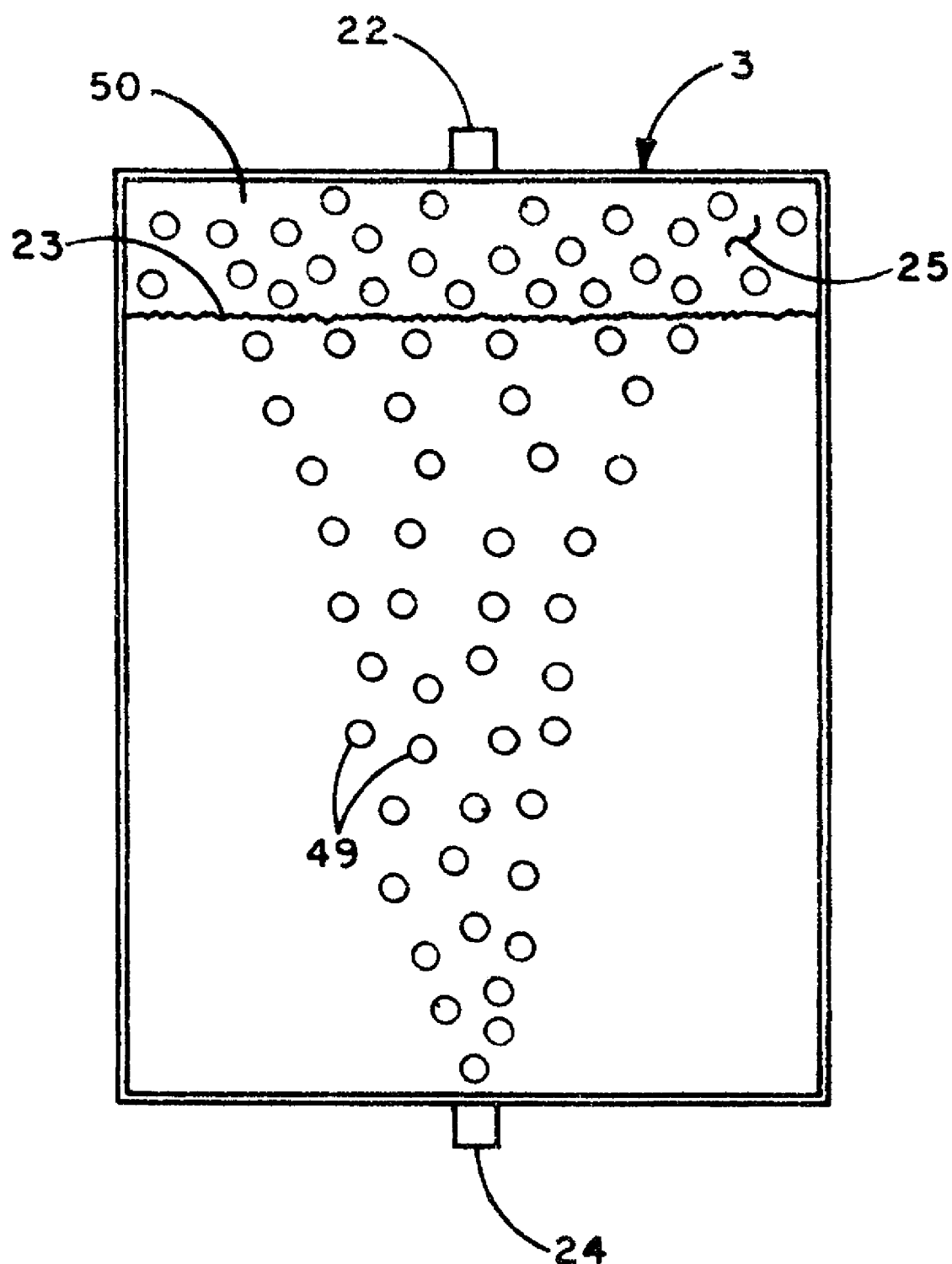

Hot hydrogen gas escapes under pressure from outlet 21 (FIG. 3, 4) via line 30 (FIG. 1) and reaches inlet 24 on tank 3. Preferably this tank is filled with substantially pure water. FIG. 5 shows how the hydrogen gas bubbles 49 rise within the column of water 23, reaching the head space 50, where humidified hydrogen gas is represented schematically by bubbles 25. This humidified hydrogen gas, comprising a mixture of hydrogen and moisture or steam, exits via outlet 22 and travels via pipeline 32 (FIG. 1) to the aforedescribed valve 5.

To turn the system "on" or "off" liquid is transferred between tanks 1 and 2. Liquid is transferred into tank 2 from tank 1 (FIG. 1) by gravity flow if tank 1 is positioned higher than tank 2. Alternatively, external air pressure, nominally 100 PSI, can be inputted though valve 10 (FIG. 1). Valve 4 (FIG. 1) is then opened to allow hydroxide solution in tank 1 (FIG. 1) to flow into tank 2 (FIG. 1) at the approximate level called for by the current engine demand for consumption of hydrogen. Then valve 4 (FIG. 1) is closed to allow pressure to build up in tank 2 (FIG. 1), as the exothermic chemical reaction produces hydrogen from the fuel tubes 18 (FIGS. 3, 4).

Liquid transfer from tank 2 (FIG. 1) to tank 1 (FIG. 1) can result from internal hydrogen gas pressure during the hydrogen generation reaction, as pressure between 20 to 300 PSI results. Closing valve 5 (FIG. 1) and opening valve 10 on tank 1 (FIG. 1) and valve 4 (FIG. 1) enables tank 2 (FIG. 1) to discharge its contents back into tank 1 (FIG. 1). When all the contents of tank 2 (FIG. 1) is thus transferred, valve 4 (FIG. 1) is closed.

From the foregoing, it will be seen that this invention is one well adapted to obtain all the ends and objects herein set forth, together with other advantages which are inherent to the structure.

As many possible embodiments may be made of the invention without departing from the scope thereof, it is to be understood that all matter herein set forth or shown in the accompanying drawings is to be interpreted as illustrative and not in a limiting sense.

What is claimed is:

1. A method for generating hydrogen gas for combustion, the method comprising the steps of:
   (a) contacting reactants consisting of aluminum metal and an aqueous potassium hydroxide solution at a temperature of approximately 180 degrees Fahrenheit by completely immersing said aluminum metal in said aqueous solution to generate hydrogen gas; and
   (b) humidifying said hydrogen gas so generated.

2. The method of claim 1, wherein step (a) is performed in a hydrogen gas generation vessel, said method further comprising preheating said aqueous potassium hydroxide solution to said temperature in a holding vessel prior to step (a) and transferring said preheated solution to said hydrogen gas generation vessel by pressurizing said holding vessel.

3. The method of claim 2, comprising pressurizing said holding vessel by air.

4. The method of claim 2, wherein said holding vessel holds approximately twelve gallons of said aqueous potassium hydroxide solution.

5. The method of claim 2, further comprising powering an engine with said hydrogen gas so humidified; collecting exhaust from said engine; condensing water from said exhaust; and returning water so condensed to said holding vessel.

6. The method of claim 1, wherein step (a) is performed in a hydrogen gas generation vessel, said method further comprising preheating said aqueous potassium hydroxide solution to said temperature in a holding vessel prior to step (a), transferring said preheated solution to said hydrogen gas generation vessel by pressurizing said holding vessel, and removing said aqeous potassium hydroxide solution from said hydrogen gas generation vessel by pressurizing said hydrogen gas generation vessel.

7. The method of claim 1, further comprising the steps of collecting waste at the bottom of said hydrogen gas generation vessel and perodically opening said hydrogen gas generating vessel to replace said aluminum metal and remove said waste.

8. The method of claim 1, wherein said aqueous potassium hydroxide solution is about 25% potassium hydroxide solution.

9. The method of claim 1, wherein step (b) comprises humidifying said hydrogen gas to approximately 100% humidity.

10. The method of claim 1, further comprising powering an engine with said hydrogen gas so humidified.

11. The method of claim 10, further comprising collecting exhaust from said engine, and condensing water from said exhaust for use as drinking water.

12. The method of claim 1, further comprising powering a fuel cell with said hydrogen gas so humidified.

13. The method of claim 12, further comprising condensing water from said fuel cell for use as drinking water.

14. The method of claim 1, further comprising transferring said hydrogen gas so humidified to a gas storage cylinder.

15. The method of claim 1, wherein said aluminum metal comprises a plurality of tubular, spaced-apart aluminum fuel tubes.

16. The method of claim 1, further comprising emptying said hydrogen gas generation tank of said aqueous potassium hydroxide solution and recovering spent aluminum as a dust or fine grained powder.

17. The method of claim 16, further comprising recycling said dust or fine grained powder.

* * * * *